Figure 1:
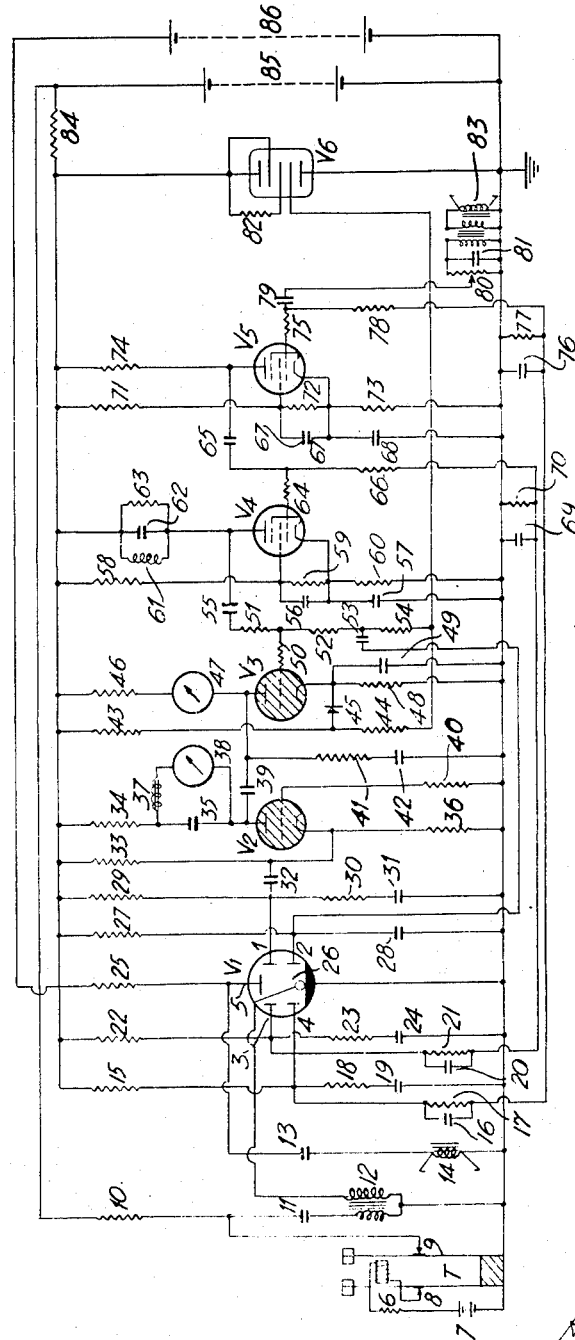

Patented Aug. 1, 1950

2,516,982

UNITED STATES PATENT OFFICE 2,516,982

ECHO SOUNDER AND SIMILAR DISTANCE MEASURING DEVICES

Hussein Hassan, Chelmsford, England, assignor to Marconi Sounding Device Company Limited, London, England, a company of Great Britain Application January 26, 1948, Serial No. 4,424

In Great Britain December 11, 1946

5 Claims. (Cl. 177—386)

This invention relates to echo sounders and similar distance measuring devices and has for its object to provide improved devices whereby accurate and continuous indications of depth or other distances may be indicated or recorded.

A further important object of the invention is to provide improved and simple echo sounders capable of use for recording depths in shallow waters up to about 20 fathoms. Such echo sounders are of considerable utility for river, harbor and similar surveying work.

Echo sounders as at present in common use operate on the principle of transmitting a pulse, receiving back an echo of said pulse from the sea bottom and measuring the time taken between transmission and reception. In essence, therefore, such echo sounders are fundamentally intermittent in indication or recording, for, in effect, a separate reading is taken for each transmitted pulse although, in some cases, the recording instrument is so arranged as not to return to zero between pulses.

According to this invention an echo sounder or similar distance measuring device comprises means for transmitting pulses at a predetermined rate and including a periodic device controlling the pulse transmitter to a constant pulse repetition frequency; means for receiving reflected echoes of said pulses; a controllable current carrying circuit including a grid controlled gas filled discharge tube which is triggered from the conductive to the non-conductive condition (or vice versa) at transmission of a pulse and triggered back to its other condition on reception of the corresponding echo, the triggering of the grid controlled gas filled discharge tube in the controllable current carrying circuit being operated by means including a triggered multi-anode mercury vapor tube; means for changing the current flow of said circuit from one predetermined value which is obtained between the transmission of a pulse and the reception of its echo to another predetermined value which is obtained at all other times; means for utilizing the average current in said controllable circuit for continuously operating a depth or other distance indicator or recorder; and means including said multi-anode mercury vapor tube for controlling the amplification sensitivity of said receiver.

The simplest form of embodiment of the invention is that in which the transmission pulse repetition frequency is maintained constant and one of the two predetermined values of current in the controllable current carrying circuit is zero current. Thus a predetermined current may be arranged in this circuit between the transmission of a pulse and the reception of its echo (echo period) and the said circuit opened at other times. Then, over a continuous length of time including a succession of transmitted pulses, the current in said circuit may be represented by a succession of similar rectangular current waves all of the same amplitude but whose individual widths along the time axis will be dependent upon the relevant echo periods. The total quantity of electricity flowing during the said continuous length of time will be the total area of all these rectangular waves. The average current is proportional to the total quantity of electricity per unit time and since this will increase in direct proportion to the ratio of the sum of the echo period times to the total time it will be a measure of the depth or distance.

It should be apparent that the converse arrangement is possible, i. e. the current in the controllable circuit may be cut-off during echo periods and caused to flow with a predetermined value at other times.

The invention is illustrated in the accompanying drawings which show diagrammatically two embodiments thereof. Fig. 1 shows the invention applied to a shallow water echo sounder suitable for taking soundings in depths up to 25 fathoms. In Fig. 1 the main elements are as follows: A magneto striction pulse transmitter or projector 14 controlled by a multi-anode mercury vapor tube VI; a thyratron V2 in the controllable current carrying circuit; a magneto striction receiver 83; a two valve receiver amplifier comprising tubes V4, V5; a second thyratron V3 controlled by the receiver amplifier and controlling the thyratron C2; a tuning fork T controlling the pulse repetition frequency; a voltage stabilizing tube V6 for ensuring constant current through V2 when it is conductive; and a current meter 38 calibrated directly in depths and from whose circuit all but the D. C. component of current is excluded by means of filter elements 35, 37.

The mercury vapor discharge tube VI controls the discharge of a condenser 13 through the winding of the magneto striction projector 14. Tube VI has a main anode 5 and four auxiliary anodes 1, 2, 3 and 4 and is so constructed that it can be rendered conductive by applying a sufficiently high positive surge between its triggering electrode 26 and the mercury pool cathode, said triggering electrode being close to, but normally insulated from, said pool cathode. Condenser 13 is charged through resistance 25 from a high voltage source 86, and when tube VI is triggered condenser 13 discharges and thus provides a heavy transmitting current pulse through 14. An electrically maintained tuning fork T initiates the necessary triggering voltage surge by discharging condenser 11, through the primary winding of transformer 12, the secondary of which is connected to the triggering electrode 26, so that constant rate of sounding is ensured.

Anode 1 of tube V1 ignites the thyratron V2 by applying through condenser 32 a negative surge, at the instant of transmission, to the cathode of V2 which is normally kept at a positive potential higher than the critical value, by means of resistances 33 and 36. Condenser 32 is charged between transmissions through resistance 29 at a slow rate determined by the resistance 29, the low resistance 30 and a condenser 31, and on transmission tube V1 is made conductive so that 32 discharges substantially instantaneously through resistance 36 thus applying a negative potential to the cathode of V2 to strike it. When struck V2 remains conducting until an amplified received echo triggers thyratron V3 which discharges condenser 42 through low resistance 41, thus applying a sufficiently negative potential on the anode of V2 by means of condenser 39 to extinguish V2. Condenser 42 is charged through resistance 46 and since the average charging current is proportional to the number of times V3 is triggered, meter 47 gives an indication of the number of echoes received.

The current through thyratron V3 is used to control the sensitivity of the receiver amplifier. In Fig. 1 rectifier 45 and its associated circuit control the cathode bias on V3, and hence the output voltage required from V4 to strike V3. The values of components 43, 44, 46 and 49 are so chosen that with one echo received for every pulse transmitted a fairly low voltage is needed to strike V3 but with the arrival also of one re-echo a striking voltage about ten times greater is required; in other words, the cathode potential of V3 is fairly low for first echoes but rises at a considerable rate with re-echoes, while the average grid potential is kept constant, so that V3 tends to be operated only by the strongest signal.

In order to ensure that no ambiguity in the recorded depth may be caused by the possibility of V3 being triggered at the instant of transmission and thus preventing V2 from igniting, a negative surge is applied to the grid of V3 at that instant by means of condenser 53 and resistance 54. This negative surge is synchronized with the instant of transmission by employing anode 2 of tube V1 to initiate its occurrence.

The receiver amplifier circuit including tubes V4, V5, is generally as well known per se except that it incorporates an automatic time-gain control which maintains the gain approximately proportional to the depth to be measured. Anodes 3 and 4 of tube V1 are used for this purpose, as indicated in Fig. 1.

As will be seen the anodes 3 and 4 are connected respectively to the control grid circuits of the tubes V4 and V5 in the receiver amplifier, the connections including capacity shunted resistance combinations 20, 21 and 16, 17 respectively. When the tube V1 changes from the non-conductive to the conductive condition (and vice versa) the potentials on the anodes 3, 4 change correspondingly and these changes smoothed and modified by the smoothing and time controlling action of the combinations 20, 21 and 16, 17 appear as the required gain controlling biases on the control grids of the tubes V4 and V5.

In one experimental apparatus in accordance with this figure and which gave satisfactory operation the pulse repetition frequency was 16.4 c./s., i. e. the period was equal to the time taken for an echo in sea water to return from a depth of 25 fathoms and the various components were dimensioned as follows:

Component 10, 100,000 ohms
Component 11, 0.5 $\mu$F.
Component 12, 50/1 step up ratio
Component 13, 2 $\mu$F.
Component 15, 10,000 ohms
Component 16, 0.001 $\mu$F.
Component 17, 1 megohm
Component 18, 47 ohms
Component 19, 0.5 $\mu$F.
Component 20, 0.001 $\mu$F.
Component 21, 1 megohm
Component 22, 100,000 ohms
Component 23, 2 ohms
Component 24, 0.5 $\mu$F.
Component 25, 22,000 ohms
Component 27, 22,000 ohms
Component 28, 0.001 $\mu$F.
Component 29, 1 megohm
Component 30, 47 ohms
Component 31, 0.1 $\mu$F.
Component 32, 0.001 $\mu$F.
Component 33, 30,000 ohms
Component 34, 18,500 ohms
Component 35, 20 $\mu$F.
Component 36, 2,200 ohms
Component 37, 50 H.
Component 39, 0.01 $\mu$F.
Component 40, 220,000 ohms
Component 41, 47 ohms
Component 42, 0.1 $\mu$F.
Component 43, 33,000 ohms
Component 44, 4,700 ohms
Component 46, 15,000 ohms
Component 48, 470,000 ohms
Component 49, 2 $\mu$F.
Component 50, 100,000 ohms
Component 51, 220,000 ohms
Component 52, 220,000 ohms
Component 53, 0.1 $\mu$F.
Component 54, 220,000 ohms
Component 55, 0.0002 $\mu$F.
Component 56, 0.1 $\mu$F.
Component 57, 0.5 $\mu$F.
Component 58, 15,000 ohms
Component 59, 15,000 ohms
Component 60, 1,500 ohms
Component 61, 120 mH.
Component 62, 0.001 $\mu$F.
Component 63, 220,000 ohms
Component 64, 220,000 ohms
Component 65, 0.0002 $\mu$F.
Component 66, 220,000 ohms
Component 67, 0.1 $\mu$F.
Component 68, 0.5 $\mu$F.
Component 69, 0.002 $\mu$F.
Component 70, 100,000 ohms
Component 71, 15,000 ohms
Component 72, 15,000 ohms
Component 73, 1,500 ohms
Component 74, 47,000 ohms
Component 75, 220,000 ohms
Component 76, 0.002 $\mu$F.
Component 77, 33,000 ohms
Component 78, 220,000 ohms
Component 79, 0.0002 $\mu$F.
Component 80, 50,000 ohms
Component 81, 0.002 $\mu$F.

Component 82, 220,000 ohms
Component 84, 2000 ohms
Component 85, 320 v.
Component 86, 1000 v.

The circuit as shown in Fig. 1 may, in practice, require a certain amount of manual control, otherwise the system is liable to "hunt," because the rectifier 45 and its associated circuit will cause the cathode bias on V3 to rise sufficiently high only when a re-echo is received. The automatic control of the necessary striking voltage of V3 will, therefore, be a little delayed, and if the gain of the amplifier is kept high some "hunting" will result. Although re-echoes should not cause any errors up to about a depth of 80 ft. (with the repetition frequency used, i. e. 16.4 c./s.) they may cause some interference owing to the automatic gain of the amplifier.

Figure 2:
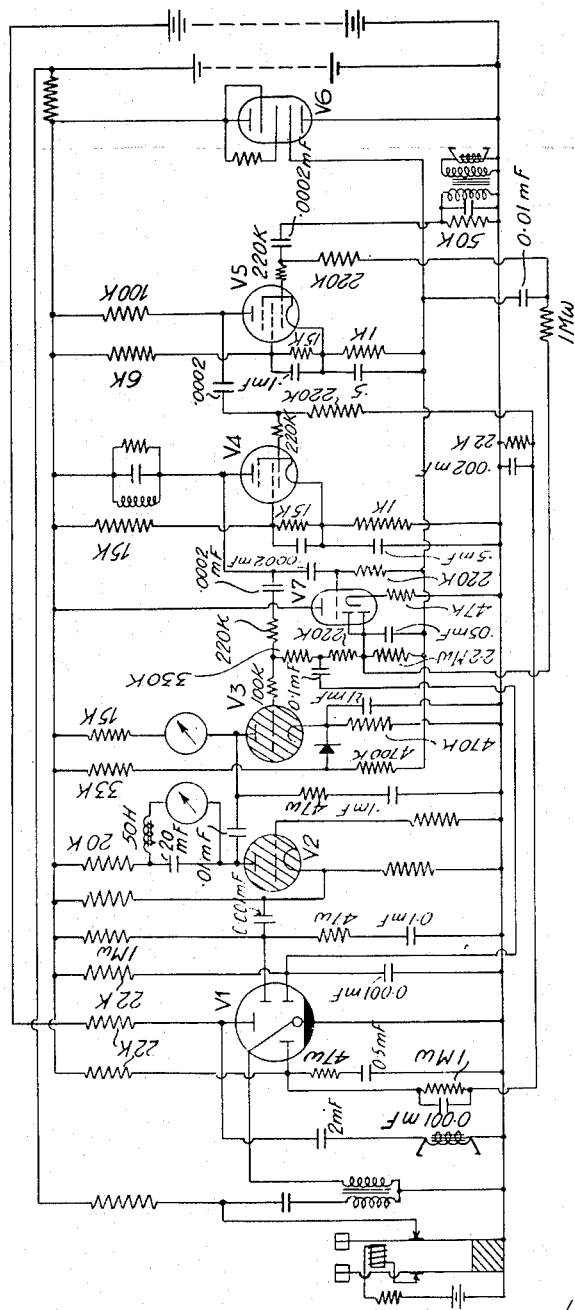

Fig. 2 shows a slightly modified circuit which is preferred because it dispenses with the need for manual control and eliminates possible errors due to the foregoing cause. The main difference between Figs. 1 and 2 lies in the provision of the additional tube constituted by the double-diode-triode V7 and in the latter circuit the gain of the amplifier is caused to vary slightly with depth and is governed mainly by the strength of the received echoes.

The triode section of V7 acts as a cathode follower and therefore offers a low impedance to the circuit of the diodes. This circuit includes a condenser of .05 μF. which charges to a potential proportional to the output of the amplifier. The grid potential of the thyratron V3 is not now kept constant but is controlled by the strength of the received echoes, in such a way that more negative bias is applied to the grid with greater amplifier output. Also, there is automatic gain control of the first stage of the amplifier (i. e. of tube V5) with the result that not only will the thyratron V3 not respond to re-echoes but also the effect of noise and aeration becomes almost negligible. The circuits of the rectifier 45 and other circuits not specifically described in Fig. 2 are similar to those shown in Fig. 1 the main operative difference being that, with Fig. 2, the control is more fully automatic and operates substantially without delay. In Fig. 2 suitable values are marked against the various components, the suffix K being employed to indicate thousands of ohms (thus 22K is 22,000 ohms), Mw being employed for megohm, W for ohm, mF for micro-farad and H for henry.

What I claim is:

1. A distance measuring device of the echo type comprising means for transmitting pulses at a predetermined rate, said means including a pulse transmitter, a periodic device, and a triggered multi-anode mercury vapor tube having its triggering electrode connected to and controlled by said periodic device and an anode-cathode circuit connected to said pulse transmitter to supply periodic pulses thereto, means for receiving reflected echoes of said pulses, a controllable current carrying circuit including a grid controlled gas filled discharge tube, means by which the discharge tube is triggered from the conductive to the non-conductive condition at transmission of a pulse and triggered back to its other condition on reception of the corresponding echo, the triggering of the grid controlled gas filled discharge tube in the controllable current carrying circuit being operated by means including another anode of said triggered multi-anode vapor tube, the triggering back being operated by means for changing the current flow of said circuit from one predetermined value which is obtained between the transmission of a pulse and the reception of its echo to another predetermined value which is obtained at all other times, means for utilizing the average current in said controllable circuit for continuously operating a depth or other distance indicator or recorder, and means including at least one further anode of said triggered multi-anode vapor tube for controlling the amplification sensitivity of said receiver, said further anode being coupled to an amplification control electrode provided in a tube forming part of said amplifier.

2. A device for measuring distance as set forth in claim 1 in which means are interposed in said controllable current carrying circuit for conducting current during the time interval between the transmission of a pulse and the reception of an echo and blocking the transmission of current at all other times.

3. A device for measuring distance as set forth in claim 1 in which a condenser and a resistor are connected with said controllable circuit and excited during the time interval between the transmission of a pulse and the reception of an echo whereby said condenser is charged throughout the time interval between the transmission of a pulse and the reception of an echo and discharged at all other times.

4. A device for measuring distance as set forth in claim 1 in which said grid controlled gas-filled discharge tube in the controllable current carrying circuit is connected with a circuit including a condenser and a resistor, a second grid controlled gas-filled discharge tube connected with said circuit, said last-mentioned tube being triggered by received echoes for charging said condenser and controlling the first-mentioned grid controlled gas-filled discharge tube in said controllable current carrying circuit.

5. A device for measuring distance as set forth in claim 1 in which a condenser and a resistor are connected with said grid controlled gas-filled discharge tube and in which a second grid controlled gas-filled discharge tube connects with said condenser and resistor, an amplifier connected with said means for receiving reflected echoes of the transmitted pulses and connections in said second grid controlled gas-filled discharge tube for controlling the sensitivity of said amplifier and for charging the condenser in circuit with said condenser and said resistor automatically upon reception of an echo.

HUSSEIN HASSAN.

REFERENCES CITED

The following references are of record in the file of this patent:

UNITED STATES PATENTS

| Number | Name | Date |
|---|---|---|
| 2,012,837 | Tear | Aug. 27, 1935 |
| 2,131,993 | Wittkuhns | Oct. 4, 1938 |
| 2,167,492 | Sproule | July 25, 1939 |
| 2,346,093 | Tolson | Apr. 4, 1944 |
| 2,446,937 | Lorance | Aug. 10, 1948 |